(12) United States Patent
Olston et al.

(10) Patent No.: US 7,899,807 B2
(45) Date of Patent: Mar. 1, 2011

(54) SYSTEM AND METHOD FOR CRAWL ORDERING BY SEARCH IMPACT

(75) Inventors: Christopher Olston, Los Altos, CA (US); Sandeep Pandey, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 456 days.

(21) Appl. No.: 12/004,881

(22) Filed: Dec. 20, 2007

(65) Prior Publication Data

US 2009/0164425 A1 Jun. 25, 2009

(51) Int. Cl.
*G06F 7/00* (2006.01)
*G06F 17/30* (2006.01)

(52) U.S. Cl. .............. 707/709; 707/711; 707/748; 707/751

(58) Field of Classification Search .......... 707/709, 707/748, 999.003, 711, 751
See application file for complete search history.

(56) References Cited

U.S. PATENT DOCUMENTS

| | | | |
|---|---|---|---|
| 6,418,433 B1 * | 7/2002 | Chakrabarti et al. | 1/1 |
| 6,961,723 B2 * | 11/2005 | Faybishenko et al. | 1/1 |
| 7,269,587 B1 * | 9/2007 | Page | 1/1 |
| 7,475,069 B2 * | 1/2009 | Blackman et al. | 1/1 |
| 7,536,389 B1 * | 5/2009 | Prabhakar et al. | 1/1 |
| 2002/0078136 A1 * | 6/2002 | Brodsky et al. | 709/203 |
| 2002/0111934 A1 * | 8/2002 | Narayan | 707/1 |
| 2002/0194161 A1 * | 12/2002 | McNamee et al. | 707/2 |
| 2005/0060297 A1 * | 3/2005 | Najork | 707/3 |
| 2005/0168460 A1 * | 8/2005 | Razdan et al. | 345/419 |
| 2006/0218138 A1 * | 9/2006 | Weare | 707/5 |
| 2006/0294052 A1 * | 12/2006 | Kulkami et al. | 707/1 |
| 2007/0022085 A1 * | 1/2007 | Kulkarni | 707/1 |
| 2007/0038608 A1 * | 2/2007 | Chen | 707/3 |
| 2007/0112761 A1 * | 5/2007 | Xu et al. | 707/5 |
| 2007/0198345 A1 * | 8/2007 | Park | 705/14 |
| 2007/0239701 A1 * | 10/2007 | Blackman et al. | 707/5 |
| 2008/0147644 A1 * | 6/2008 | Aridor et al. | 707/5 |
| 2008/0243812 A1 * | 10/2008 | Chien et al. | 707/5 |
| 2008/0313247 A1 * | 12/2008 | Galvin | 708/200 |
| 2009/0006365 A1 * | 1/2009 | Liu et al. | 707/5 |
| 2009/0019354 A1 * | 1/2009 | Jaiswal et al. | 715/224 |

\* cited by examiner

*Primary Examiner*—Jean B. Fleurantin
*Assistant Examiner*—Mark E Hershley
(74) *Attorney, Agent, or Firm*—Law Office of Robert O. Bolan

(57) ABSTRACT

An improved system and method for crawl ordering of a web crawler by impact upon search results of a search engine is provided. Content-independent features of uncrawled web pages may be obtained, and the impact of uncrawled web pages may be estimated for queries of a workload using the content-independent features. The impact of uncrawled web pages may be estimated for queries by computing an expected impact score for uncrawled web pages that match needy queries. Query sketches may be created for a subset of the queries by computing an expected impact score for crawled web pages and uncrawled web pages matching the queries. Web pages may then be selected to fetch using a combined query-based estimate and query-independent estimate of the impact of fetching the web pages on search query results.

24 Claims, 5 Drawing Sheets

SYSTEM AND METHOD FOR CRAWL ORDERING BY SEARCH IMPACT

FIELD OF THE INVENTION

The invention relates generally to computer systems, and more particularly to an improved system and method for crawl ordering of a web crawler by impact upon search results of a search engine.

BACKGROUND OF THE INVENTION

Web crawling is a well-studied problem. The crawling problem has three main aspects: discovery of new URLs, acquisition of the content associated with a subset of the discovered URLs, and periodic synchronization of previously acquired pages to maintain freshness. Prior work on the acquisition of the content associated with a subset of the discovered URLs focused on ordering pages according to a query-independent notion of page importance. See for example, S. Abiteboul, M. Preda, and G. Cobena, *Adaptive On-line Page Importance Computation*, In Proceeding of WWW, 2003; J. Cho, H. Garc'ya-Molina, and L. Page, *Efficient Crawling Through URL Ordering*, Computer Networks and ISDN Systems, 30(1-7):161-172, 1998; and M. Najork and J. L. Wiener, *Breadth-First Search Crawling Yields High-Quality Pages*, In Proceeding of WWW, 2001. In particular, web page fetching has been prioritized by query-independent features such as link-based importance or PageRank. Unfortunately, query-independent importance measures do not provide the best prioritization policy for a search engine crawler.

The problem with using a query-independent importance measure to do crawl prioritization is that it only accumulates content on well-established topics whose pages have many links. However, the number of tail queries, that is queries that lie in the tail of the query frequency distribution, seen by search engines today is too large to ignore. Other approaches to crawl prioritization include focused crawling. See for example, S. Chakrabarti, M. Van den Berg, and B. Dom, Focused Crawling: *A New Approach to Topic-Specific Web Resource Discovery*, In Proceeding of WWW, 1999. However, focused crawling scours the Web in search of pages relevant to a particular topic or a small set of topics. Such focused crawling is guided by topic classification rather than the relevancy of queries issued by user requests.

What is needed is a way to bias web crawling toward fetching web pages that match any topic for which the search engine currently does not have enough relevant, high-quality content as requested by users.

SUMMARY OF THE INVENTION

The present invention provides a system and method for crawl ordering of a web crawler by impact upon search results of a search engine. Once a web crawler has discovered new web pages, the present invention may apply a query-centric approach to determine an order for acquisition of the content associated with a subset of the discovered web pages. Content-independent features of uncrawled web pages, such as a URL string, inlinks, a host affiliation, and referring anchor-text, may be obtained, and the impact of uncrawled web pages may be estimated for queries of a workload using the content-independent features. The impact of uncrawled web pages may be estimated for queries by computing an expected impact score for uncrawled web pages that match queries. Query sketches may be created for a subset of the queries by computing an expected impact score for crawled web pages and uncrawled web pages matching the queries. Web pages may then be selected to fetch using a combined query-based estimate and query-independent estimate of the impact of fetching the web pages on search query results.

To estimate the impact of uncrawled web pages for queries of a workload using content-independent features, a representative workload of search queries and scores of the top search results may be obtained. Needy queries may be identified from the workload of search queries by computing a neediness score that may estimate the impact of improvement to the result set of a query for pages fetched in a crawl cycle. Uncrawled web pages may be identified that match needy queries using content-independent features of the uncrawled web pages, and an expected impact score may be computed for the needy queries using the content-independent features of the matching uncrawled web pages. This query-based estimate that takes into account query neediness and relevance considerations may be combined with a query-independent estimate to determine an ordering of web pages to fetch. A combined weighted score may be computed for crawled and matching uncrawled web pages for the needy queries, and web pages may be fetched in a crawl cycle in order by the combined weighted score computed for the needy queries.

The present invention may select the web pages of highest estimated impact so that a web crawler may narrow the gap between the web pages the search engine currently returns in response to user queries, and the ones it could return if the appropriate content was crawled. By using a new query-centric crawl ordering technique, the present invention may identify queries that can potentially have their search results improved by crawling and may select uncrawled web pages to fetch given these queries, the search engine's scoring function, and features of a page available prior to fetching it.

Other advantages will become apparent from the following detailed description when taken in conjunction with the drawings, in which:

DETAILED DESCRIPTION

Exemplary Operating Environment

Figure 1:
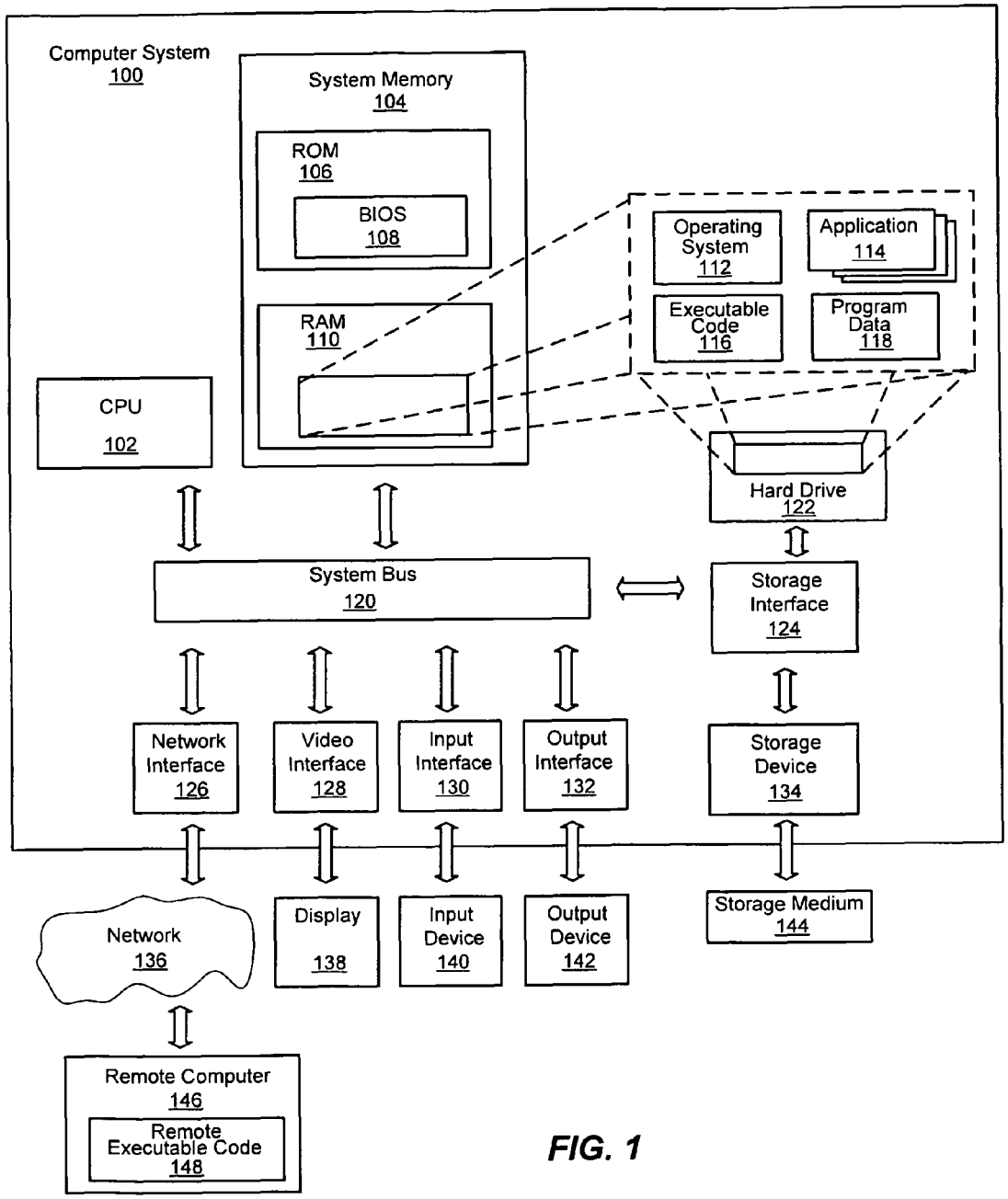
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used.

Crawl Ordering by Search Impact

The present invention is generally directed towards a system and method for crawl ordering of a web crawler by impact upon search results of a search engine. By using a new query-centric crawl ordering technique, the present invention may identify queries that can potentially have their search results improved by crawling and may select uncrawled web pages to fetch given these queries, the search engine's scoring function, and features of a page available prior to fetching it. To this end, the impact of uncrawled web pages may be estimated for needy queries of a workload using the content-independent features. Needy query sketches may be created for a subset of the needy queries by computing an expected impact score for crawled web pages and uncrawled web pages matching the needy queries. Web pages may then be selected to fetch using a combined query-based estimate and query-independent estimate of the impact of fetching the web pages on search query results.

As will be seen, by focusing directly on what topics the search engine users are interested in, and on how much impact a page would have on the search engine's ability to serve those interests, uncrawled web pages may be fetched that would receive a good rank position for users' queries, even if they have a relatively low query-independentscore. As will be understood, the various block diagrams, flow charts and scenarios described herein are only examples, and there are many other scenarios to which the present invention will apply.

Figure 2:
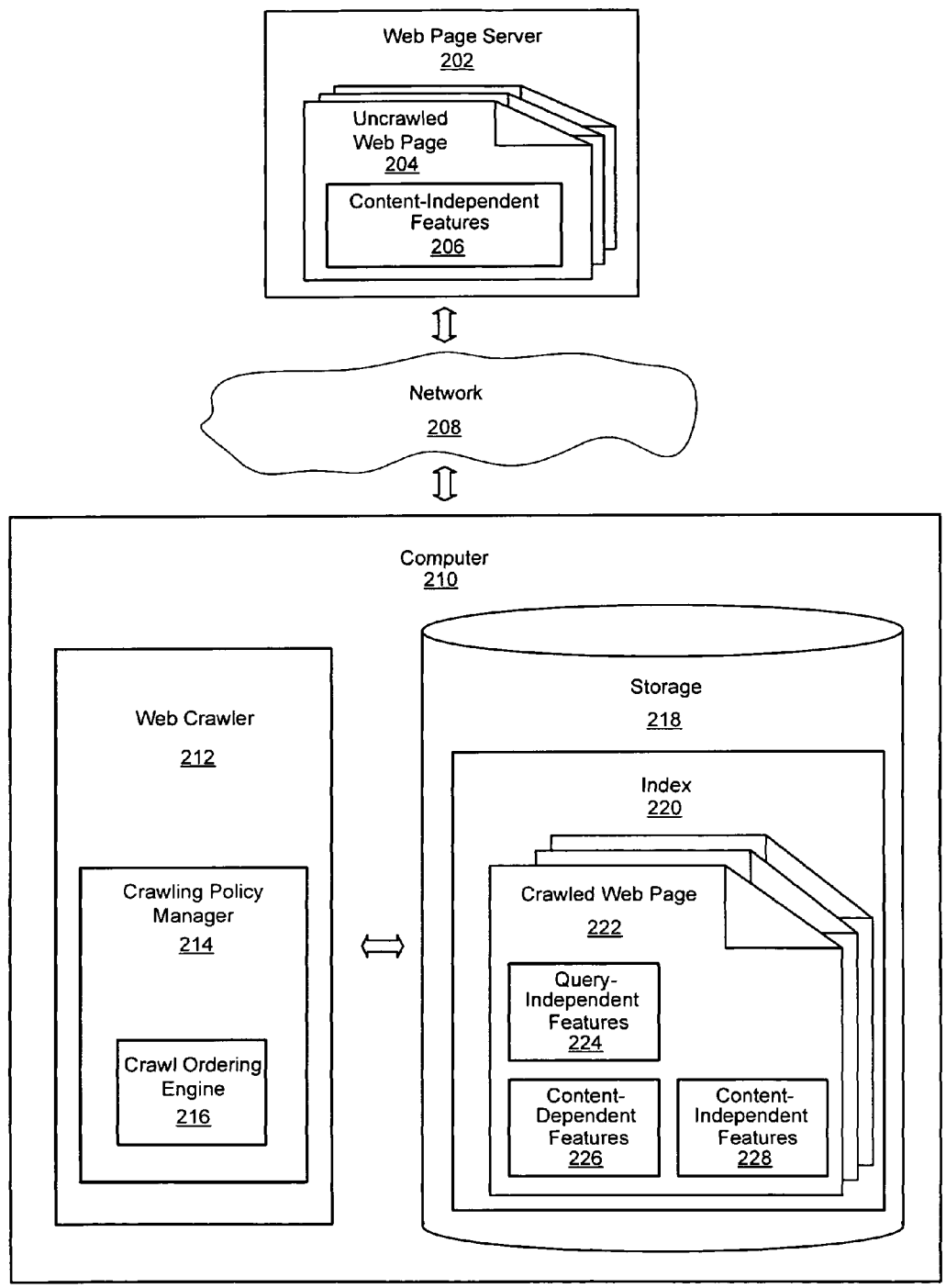
FIG. 2 is a block diagram generally representing an exemplary architecture of system components for crawl ordering of a web crawler by impact upon search results of a search engine, in accordance with an aspect of the present invention.

Turning to FIG. 2 of the drawings, there is shown a block diagram generally representing an exemplary architecture of system components for crawl ordering of a web crawler by impact upon search results of a search engine. Those skilled in the art will appreciate that the functionality implemented within the blocks illustrated in the diagram may be implemented as separate components or the functionality of several or all of the blocks may be implemented within a single component. For example, the functionality for the crawl ordering engine 216 may be included in the same component as the crawling policy manager 214, or the functionality of the crawl ordering engine 216 may be implemented as a separate component from the crawling policy manager 214. Moreover, those skilled in the art will appreciate that the functionality implemented within the blocks illustrated in the diagram may be executed on a single computer or distributed across a plurality of computers for execution.

In various embodiments, a web page server 202 may be operably coupled to a computer 210 by a network 208. The web page server 202 may be a computer such as computer system 100 of FIG. 1. The network 208 may be any type of network such as a local area network (LAN), a wide area network (WAN), or other type of network. The web page server 202 may include functionality for receiving a request for content, such as a web page, and for sending the requested content. The web page server 202 may include uncrawled web pages 204 that may have associated content-independent features 206. Content-independent features may include URL string, inlinks, host affiliation, referring anchortext and so forth.

The computer 210 may be any type of computer system or computing device such as computer system 100 of FIG. 1. In general, the computer 210 may provide services for requesting content from a web page server and for receiving the content requested. In particular, the computer 210 may include an operably coupled web crawler 212 for fetching web pages to update content indexed for use by search engines. A web page may be any information that may be addressable by a URL, including a document, an image, audio, and so forth. The web crawler 212 may include a crawling policy manager 214 that may implement a policy for determining the web pages to fetch. The crawling policy manager 214 may also include a crawl ordering engine 216 for determining an order for fetching web pages. Each of these modules may also be any type of executable software code such as a kernel component, an application program, a linked library, an object with methods, or other type of executable software code.

The web crawler 212 may be operably coupled to a database of information such as storage 218 that may include an index 220 of crawled web pages 222. Each crawled web page 222 may have query-independent features 224, content-dependent features 226, and content-independent features 228 that may stored as part of the index 220. Query-independent features 224 may include link-based importance/PageRank or PageRank score. Content-dependent features 226 may include a page title, words on the page, and so forth. And content-independent features 228 may include may include URL string, inlinks, host affiliation, referring anchortext and so forth.

Once a web crawler has discovered new web pages, the present invention may apply a query-centric approach to determine an order for acquisition of the content associated with a subset of the discovered web pages. By focusing directly on what topics the search engine users are interested in, and on how much impact a page would have on the search engine's ability to serve those interests, uncrawled web pages may be fetched that would receive a good rank position for users' queries, even if they have a relatively low query-independent score because, for example, they pertain to an obscure "tail topic," or are new and have not yet accumulated many in-links. The impact of fetching a web page may thus generally depend on the following factors: (a) the queries for which the web page is relevant and how often those queries are issued by users (b) the ranks that the web page would receive in the result lists of those queries, and (c) the attention paid by users to the results displayed at those ranks.

Measuring a web page's impact requires computing its rank in the result list of a query, as determined by the search engine's scoring function. Typically a scoring function takes many features about a web page as its input, such as page content, URL string, and referring anchortext. See for example, M. Richardson, A. Prakash, and E. Brill, *Beyond PageRank: Machine Learning for Static Ranking*, In Proceedings of WWW, 2006. The features used by a scoring function may be divided into two groups: content-dependent, such as page title and words on the page, and content-independent, such as URL string, inlinks, host affiliation, and referring anchortext. For an uncrawled web page, the web crawler may have access to the content-independent features of the page only. Hence, the challenge is in estimating its rank for queries, while only knowing a subset of its scoring features, in particular the content-independent ones. Fortunately, content-independent features, such as inlinks/PageRank and referring anchortext, tend to be heavily weighted in the overall scoring procedure (see S. Brin and L. Page, *The Anatomy of a Large-Scale Hypertextual Web Search Engine*, In Proceedings of WWW, 1998), so this estimation may be performed reasonably well. Given a scoring function $S(p,q)$ over page p and query q, a new scoring function $S'(p,q)$ may be defined which takes content-independent features of page p as input and outputs a probability distribution over $S(p,q)$. Then the impact of each uncrawled page may be estimated on a representative query workload using this basic approach. The representative query workload may be constructed from past queries expected to reoccur, and perhaps also anticipated future queries forecasted from news, blogs, or other early indicators of hot topics.

There may be two important refinements to this basic approach. First, the workload-based calculations may be supplemented with query-independent cues given that it is impossible to predict the future workload with full accuracy. Second, the web crawler may focus on a small subset of the query workload, in particular, those queries whose results are likely to be improved by crawling new pages.

More formally, consider S(p,q) to denote the search engine scoring function, where p is a page and q is a query. Also consider R(p,q) to denote the rank of page p in the ranked result list of query q, as computed using S(p,q) over all crawled and uncrawled pages. Then the impact of page p with respect to query q may be defined as: I(p,q)=V(R(p,q)), where V(r) denotes the visibility of rank r in the result list of a query. Formally, the visibility of rank r is the probability of an average user to view a page when displayed at rank r in a result list. Since users mostly pay attention to the top-ranked pages (see R. Lempel and S. Moran, *Predictive Caching and Prefetching of Query Results in Search Engines*, In Proceedings of WWW, 2003), V may be expected to be larger for smaller ranks (i.e., ranks closer to 1).

Given a query workload Q consisting of queries and their associated frequencies, the total impact of page p may be defined as:

$$I(p, Q) = \sum_{q \in Q} f(q) \cdot I(p, q), \text{ or equivalently}$$

$$I(p, Q) = \sum_{q \in Q} f(q) \cdot V(R(p, q)),$$

where f(q) is the frequency of query q in workload Q.

Since crawling is generally performed in batches or cycles, fetching web pages in order of impact may be performed by selecting web pages to fetch in the next cycle. To estimate the impact of crawling web pages, a new scoring function S' may be defined which takes the content-independent features of page p and query q as input and outputs a probability distribution of S(p,q) of values that S(p,q) can take along with their probabilities.

A query sketch consists of the set of pages relevant to a query and their associated score for crawled pages or score distribution for uncrawled pages. From the set of query sketches for queries in a workload, it is possible to derive bounds or construct probability distributions for rank R(p,q) and impact I(p,q). Given n crawled and m uncrawled pages, and the sketches of all queries in the workload Q, the objective is to select the c pages of maximum total impact (in either the expected sense or the worst-case sense), where c<<m.

Formally, consider indicator variable $X_p \in \{0,1\}$ to denote the event of fetching uncrawled page p, such that $X_p=1$ if p is fetched and 0 otherwise. Then, the crawl selection optimization problem for the expected case objective can be stated as follows:

$$\max E\left(\sum_p (X_p \cdot I(p, Q))\right), \text{ where } \sum_p X_p = c.$$

A similar formulation can be given for the worst case objective.

Due to the especially bad complexity of the worst case variant, practical approximate methods may be used for expected impact. Most of the complexity of the expected case variant is due to considering the score distributions of uncrawled pages. Hence the following simplification may be made: function S'(·) outputs an expected score value instead of a score distribution.

Also a restricted visibility function V(·) may be used. Following the implementation of the restricted visibility function in S. Chakrabarti, A. M. Frieze, and J. Vera, *The Influence of Search Engines on Preferential Attachment*, In Proceedings Symposium on Discrete Algorithms, 2005, V(·) may be a step function where V(r)=1 for r≦K and V(r)=0 otherwise, for some K≧1. This form models the steep drop in attention between the top results which are immediately visible on the user's screen and the subsequent results that come into view if the user scrolls or clicks.

Under the above simplifications, the impact maximization problem can be stated as follows: given the query sketches, find c pages of maximal total impact, where impact is:

$$I(p, Q) = \sum_{q \in Q} f(q) \cdot V(R(p, q)), \text{ or equivalently}$$

$$I(p, Q) = \sum_{q \in Q} f(q) \cdot T(p, q), \text{ where}$$

$$T(p, q) = \begin{cases} 1 & \text{if } p \text{ is among the top } K \text{ results in the sketch of } q \\ 0 & \text{otherwise.} \end{cases}$$

Since the output, of S'(·) is now a scalar value, a query sketch consists of scalar score values only, rather than a mixture of scalar values and distributions.

In other words, the impact of page p is equal to the sum of the frequencies of the queries for which page p is among the top K results. This number is easy to obtain from the query sketches. Note that the query sketches need only contain the top K pages. To speed up the impact computation, only sketches may be built and used for a small subset of queries, in particular those that may occur with non-negligible frequency, and those that can potentially have their results improved by crawling new pages. In steady state, most frequently-occurring queries have already been supplied with plenty of high-quality relevant pages, and queries that do require special attention from the crawler typically constitute a small minority. Such queries may be referred to herein as needy queries.

Figure 3:
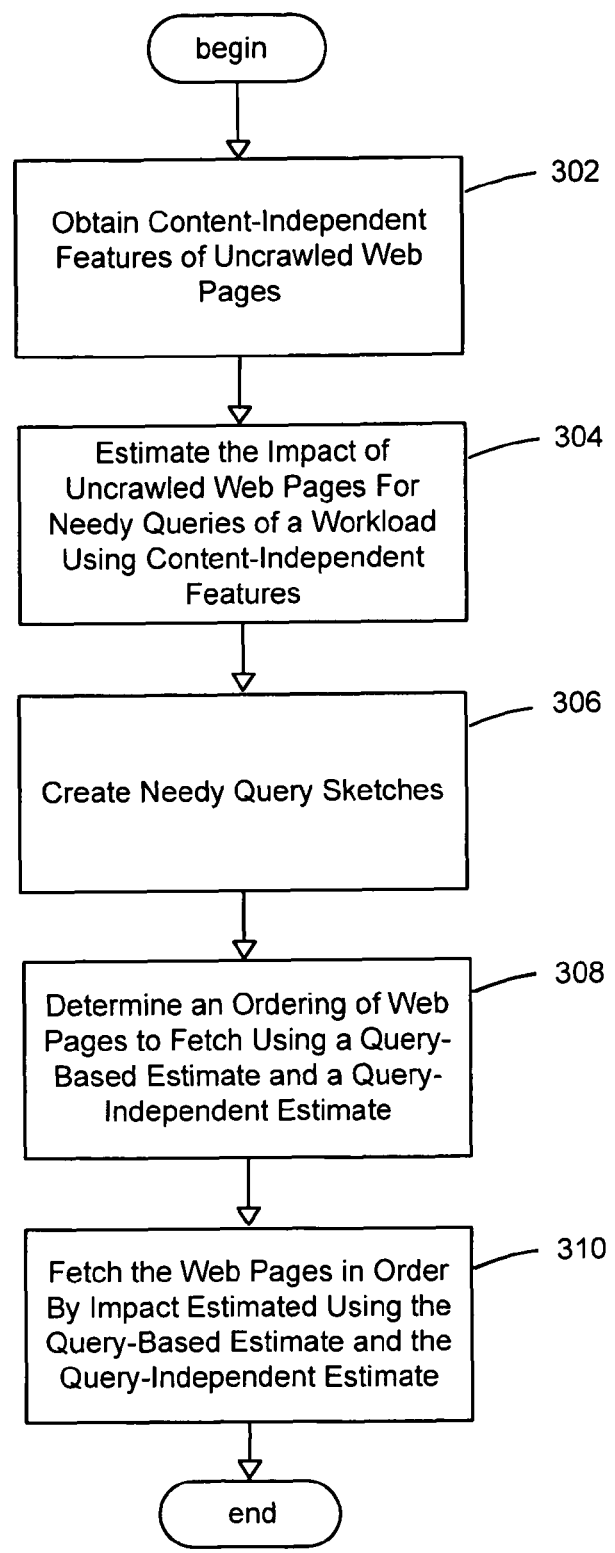
FIG. 3 is a flowchart generally representing the steps undertaken in one embodiment for crawl ordering of a web crawler by impact upon search results of a search engine, in accordance with an aspect of the present invention.

The overall process of selecting pages to fetch in the next crawl cycle may be represented by FIG. 3 which presents a flowchart for generally representing the steps undertaken in one embodiment for crawl ordering of a web crawler by impact upon search results of a search engine. At step 302, content-independent features of uncrawled web pages may be obtained. For example, a web crawler may build an index of information from crawled web pages that may include content-independent features of uncrawled web pages such as a URL string, inlinks, a host affiliation, and referring anchor-text. These content-independent features of uncrawled web pages may be obtained from the web crawler index. At step 304, the impact of uncrawled web pages may be estimated for needy queries of a workload using content-independent features. For instance, given a query workload and top K result scores, queries may be classified as either needy or non-needy by determining a neediness score of query q defined to be $$\text{neediness}(q) = I(C, q) = f(q) \cdot \left(\sum_{p \in C} I(p, q)\right),$$

$$\text{or equivalently } I(C, q) = f(q) \cdot \left(\sum_{p \in C} T(p, q)\right).$$

The impact of uncrawled web pages may then be estimated for needy queries by computing an expected impact score S'(p,q) for uncrawled web pages, p, that match needy queries, q. This process of step 304 is described in more detail in conjunction with FIG. 4 below.

At step 306, needy query sketches may be created. For each needy query, its query sketch of the top K expected scores for crawled and matching uncrawled pages may be created. At step 308, an ordering of web pages to fetch may be determined using a query-based estimate and a query-independent estimate. In an embodiment, a query-based estimate for needy queries, such as an expected impact score S'(p,q) computed for uncrawled web pages, p, that match needy queries, q, as described in more detail in conjunction with FIG. 4 below, may be combined with a query-independent estimate derived by learning a function from query-independent page features such as PageRank to impact, using a training set of previously-crawled pages. This process of step 308 is described in more detail in conjunction with FIG. 5 below. At step 310, web pages may be fetched in order by impact estimated using the query-based estimate and a query-independent estimate. In an embodiment, rather than running the steps of FIG. 3 from scratch for each new crawl cycle, key data structures such as the query sketches may be maintained incrementally. Incremental maintenance of top-K structures such as our query sketches can be done using known techniques (see for example K. Yi, H. Yu, J. Yang, G. Xia, and Y. Chen, *Efficient Maintenance of Materialized Top-k Views*, In Proceedings of International Conference on Data Engineering, 2003.)

Figure 4:
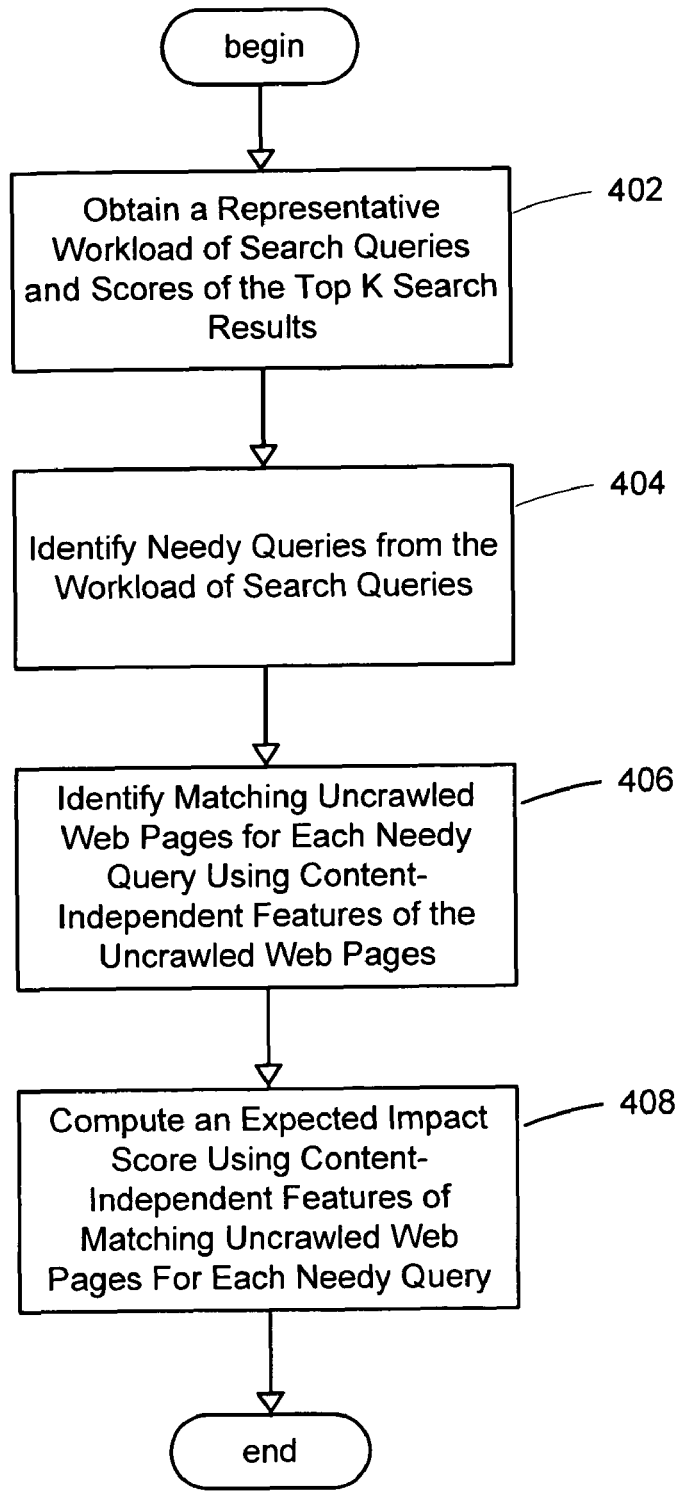
FIG. 4 is a flowchart generally representing the steps undertaken in one embodiment for estimating the impact of uncrawled web pages for needy queries of a workload using content-independent features, in accordance with an aspect of the present invention.

FIG. 4 presents a flowchart for generally representing the steps undertaken in one embodiment for estimating the impact of uncrawled web pages for needy queries of a workload using content-independent features. At step 402, a representative workload of search queries and scores of the top K search results may be obtained. In an embodiment, a representative workload of search queries with associated frequencies may be obtained from historical logs combined with forecasting methods. At step 404, needy queries may be identified from the workload of search queries. A query is needy if there is inadequate relevant content, and a neediness score may be computed that may estimate the impact of improvement to the result set of a query for pages fetched in a crawl cycle. If C is the set of pages fetched in a given crawl cycle, the portion of impact achieved for a given query q is:

$$I(C, q) = f(q) \cdot \left( \sum_{p \in C} I(p, q) \right) = f(q) \cdot \left( \sum_{p \in C} T(p, q) \right).$$

Accordingly, the neediness score of query q may be defined to be neediness(q)=I(C,q), and the queries with highest neediness scores should be selected in each crawl cycle.

The neediness score has two components: the query frequency f(q), and a term that represents the improvement to the result set of query q, which depends on the set C of pages fetched in the next crawl cycle. To eliminate the circularity of needing to identify needy queries in order to select pages to fetch and needing to know which pages to fetch in order to identify needy queries, an estimate of the improvability or expected improvement of a query may be made based on some features of the query, such as its current score distribution. Given data on query result improvement achieved in previous crawl cycles, a function from query features to improvability can be fit using regression.

There are many ways to learn such a function. One simple method that works well in an embodiment is to use the average score of the current top K results for a query as a feature, and use log-linear regression to fit a function from this feature to improvability. The intuition is that queries with low-score results, for example "tail queries" on nascent or obscure topics, are more likely to be improvable than ones with high-score results whose result pages are highly entrenched and are unlikely to be displaced by newcomers.

Once needy queries may be identified from the workload of search queries, matching uncrawled web pages may be identified for needy queries at step 406 using content-independent features of the uncrawled web pages. Given a query q, uncrawled web pages p may be identified that "match" q by having a nonzero score S(p,q). The only information available for matching uncrawled pages is content-independent metadata such as URL strings and referring anchortext strings. Because matches cannot be determine with full accuracy, page p may be labeled as a match for query q if the amount of textual overlap between the query string and p's URL and referring anchortext strings may be above some threshold. In an embodiment, each of these strings may be converted into word-level n-grams for all n∈[1,g] where g is a constant giving the maximum n-gram length, and a match may be declared if at least ρ fraction of the query n-grams match one of the page n-grams, for some ρ∈[0,1]. Using a smaller value of ρ results in greater accuracy in the subsequent impact estimation step, but also result in greater overhead, and vice-versa. In an embodiment, ρ may be set to 1 to make the results conservative and to favor efficiency over accuracy. To identify matches efficiently, an index may be maintained over the uncrawled page n-grams and lookups may be performed with each needy query n-gram.

Once matching uncrawled web pages may be identified for needy queries using content-independent features of the uncrawled web pages, an expected impact score may be computed at step 408 using the content-independent features of the matching uncrawled web pages for the needy queries. For example, the expected score may be computed for S'(p,q) and a web page may "match" a query if it receives a nonzero expected score. After computing an expected impact score, processing for estimating the impact of uncrawled web pages for needy queries of a workload using content-independent features may be finished.

Because selecting web pages to fetch based solely on matching URL and anchortext strings with needy queries has some fundamental limitations, selecting web pages to fetch may be determined using a query-based estimate and a query-independent estimate. For instance, one problem with selecting web pages to fetch based solely on content-independent features is that some web pages have little or no referring anchortext and lack a meaningful URL, yet still turn out to be impactful for other reasons such as high PageRank, and therefore worth fetching. Perhaps a more significant concern is that the query workload model may not cover all important future queries. For these reasons, a query-based estimate that takes into account query neediness and relevance considerations may be combined with a query-independent estimate that is not vulnerable to the problems just mentioned.

Figure 5:
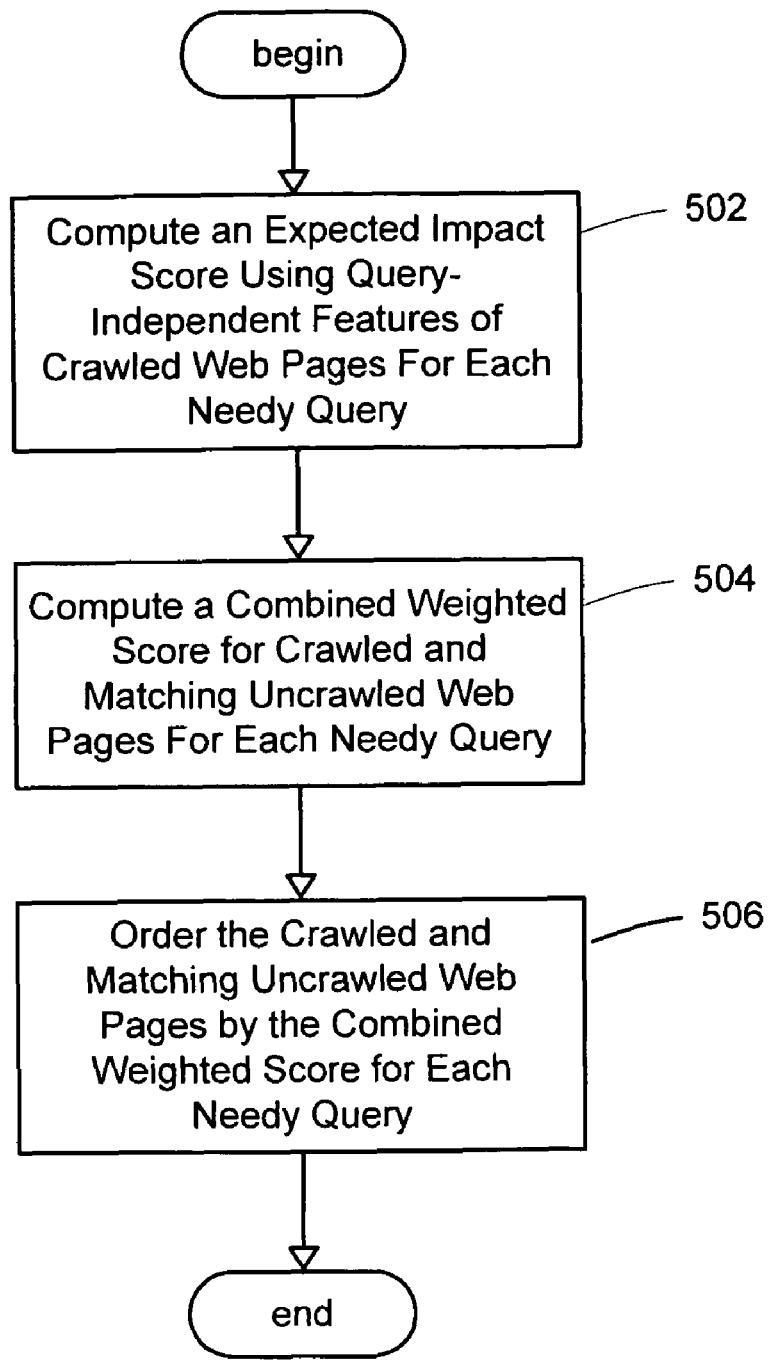
FIG. 5 is a flowchart generally representing the steps undertaken in one embodiment for determining an ordering of web pages to fetch using a query-based estimate and a query-independent estimate of the impact of fetching the web pages on search query results, in accordance with an aspect of the present invention.

FIG. 5 presents a flowchart for generally representing the steps undertaken in one embodiment for determining an ordering of web pages to fetch using a query-based estimate and a query-independent estimate of the impact of fetching the web pages on search query results. At step 502, an expected impact score may be computed using query-independent features of crawled web pages for the needy queries. In an embodiment, a query-independent estimate may be derived by learning a function from query-independent page features, such as PageRank to impact, using a training set of previously-crawled pages, and regression may be used to fit a quadratic function. At step 504, a combined weighted score may be computed for crawled and matching uncrawled web pages for the needy queries. A weighted average may be used to combine the query-independent impact estimate with the query-based estimate. In an embodiment, the weight of the query-based estimate may be set to 0.9 and the weight of the query-independent estimate may be set to 0.1. And the crawled and matching uncrawled web pages may be ordered at step 506 by the combined weighted score computed for the needy queries.

Thus the present invention may select the web pages of highest estimated impact so that a web crawler may narrow the gap between the web pages the search engine currently returns in response to user queries, and the ones it could return if the appropriate content was crawled. By using a new query-centric crawl ordering technique, the present invention may identify queries that can potentially have their search results improved by crawling and may select uncrawled web pages to fetch given these queries, the search engine's scoring function, and features of a page available prior to fetching it. Not only does this technique achieve substantially greater impact on search results than the conventional query-independent technique, this technique is especially impactful for "tail queries" which in aggregate represent a substantial fraction of all queries, yet are not necessarily well served by conventional query-independent techniques.

As can be seen from the foregoing detailed description, the present invention provides an improved system and method for crawl ordering of a web crawler by impact upon search results of a search engine. Content-independent features of uncrawled web pages may be obtained, and the impact of uncrawled web pages may be estimated for needy queries identified from a workload using the content-independent features. For each needy query, a query sketch of the top K expected scores for crawled and matching uncrawled web pages may be created. And an ordering of web pages to fetch may be determined using a combined query-based estimate of fetching uncrawled web pages and a query-independent estimate computed using query-independent features of crawled web pages for the needy queries. By focusing directly on what topics the search engine users are interested in, and on how much impact a page would have on the search engine's ability to serve those interests, uncrawled web pages may be fetched that would receive a good rank position for users' queries, even if they have a relatively low query-independent score because, for example, they pertain to an obscure "tail topic," or are new and have not yet accumulated many in-links. As a result, the system and method provide significant advantages and benefits needed in contemporary computing, and more particularly in online search applications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for fetching a web page, comprising:
    an index for use by a search engine, wherein the index indexes a set of previously crawled web pages;
    a web crawler for fetching a plurality of web pages to update said index; and
    a storage device that stores information about a set of queries that have been received by the search engine;
    wherein said storage device further stores data that indicates which queries in the set of queries are needy queries;
    wherein said needy queries are queries for which the index does not currently index adequate, relevant content;
    a crawling policy manager, operably coupled to the web crawler, for implementing a policy for estimating an impact, on said needy queries, of fetching a particular uncrawled web page by comparing terms of said needy queries with at least one of: (a) an anchortext of links, obtained from the previously crawled web pages, that point to the particular uncrawled web page, and (b) a Uniform Resource Locator (URL), obtained from the previously crawled web pages, that points to the particular uncrawled web page;
    a crawl ordering engine, operably coupled to the crawling policy manager, for ordering web pages to fetch by the web crawler based, at least in part, on the estimated impact, on said needy queries, of crawling the particular uncrawled page.

2. The system of claim 1, wherein the crawling policy manager for estimating the impact of fetching the particular uncrawled web page further combines a query-based estimate and a query-independent estimate for said particular uncrawled web page by computing a weighted average of said query-based estimate and said query-independent estimate for said particular uncrawled web page;
    wherein said query-based estimate for said particular uncrawled web page indicates how well said particular uncrawled web page meets neediness and relevance requirements of the needy queries and is determined based, at least in part, on the anchortext and the URL that point to the particular uncrawled web page;
    wherein said query-independent estimate of said particular uncrawled web page is determined based on query-independent features of said particular uncrawled web page.

3. The system of claim 2, wherein the crawling policy manager for estimating the impact of fetching the particular uncrawled web page further creates query sketches, for said needy queries, by computing an expected impact score for the particular uncrawled web page and expected impact scores for the previously crawled web pages that match said needy queries, and uses the query sketches to determine the query-based estimate and the query-independent estimate for the particular uncrawled web page.

4. A computer-implemented method for fetching a web page, comprising:
    creating an index for use by a search engine, wherein the index indexes a set of previously crawled web pages;
    determining which queries, from a set of queries that have been previously submitted to a search engine, qualify as needy queries;
    wherein said needy queries are queries for which the index does not currently index adequate, relevant content;
    estimating an impact, on said needy queries, of fetching a particular uncrawled web page by comparing terms of said needy queries with at least one of: (a) an anchortext of links, obtained from the previously crawled web pages, that point to the particular uncrawled web page, and (b) a Uniform Resource Locator (URL), obtained from the previously crawled web pages, that points to the particular uncrawled web page;
    ordering web pages to fetch by a web crawler based, at least in part, on the estimated impact, on said needy queries, of crawling the particular uncrawled page wherein the method is performed by one or more computing devices.

5. The method of claim 4, wherein the step of estimating the impact of fetching the particular uncrawled web page further comprises combining a query-based estimate and a query-independent estimate for said particular uncrawled web page by computing a weighted average of said query-based estimate and said query-independent estimate for said particular uncrawled web page;

wherein said query-based estimate for said particular uncrawled web page indicates how well said particular uncrawled web page meets neediness and relevance requirements of the needy queries and is determined based, at least in part, on the anchortext and the URL that point to the particular uncrawled web page;

wherein said query-independent estimate of said particular uncrawled web page is determined based on query-independent features of said particular uncrawled web page.

6. The method of claim 5, wherein the step of estimating the impact of fetching the particular uncrawled web page further comprises creating query sketches, for said needy queries, by computing an expected impact score for the particular uncrawled web page and expected impact scores for the previously crawled web pages that match said needy queries, and uses the query sketches to determine the query-based estimate and the query-independent estimate for the particular uncrawled web page.

7. The method of claim 5, wherein the step of ordering of the web pages to fetch by the web crawler further comprises using the combined query-based estimate and query-independent estimate for said particular web page and computing an expected impact score using query-independent features of the particular uncrawled web page.

8. The method of claim 4, wherein the step of comparing terms of said needy queries with at least one of: (a) the anchortext of links, obtained from the previously crawled web pages, that points to the particular uncrawled web page, and (b) the URL, obtained from the previously crawled web pages, that points to the particular uncrawled web page further comprises comparing a word-level n-gram representing a query string in a particular needy query and a word-level n-gram representing an anchortext string.

9. The method of claim 4, wherein the step of estimating the impact, on said needy queries, of fetching the particular uncrawled web page further comprises computing neediness scores for said needy queries, wherein a neediness score, for a particular needy query, includes a particular needy query frequency that indicates how often the particular needy query has been issued to the search engine, and computing an improvement factor that indicates an improvement to search results generated for the particular needy query if the particular uncrawled web page would have been fetched.

10. A computer system for fetching a web page, comprising:

means for creating an index for use by a search engine, wherein the index indexes a set of previously crawled web pages;

means for determining which queries, from a set of queries that have been previously submitted to a search engine, qualify as needy queries;

wherein said needy queries are queries for which the index does not currently index adequate, relevant content;

means for estimating an impact, on said needy queries, of fetching a particular uncrawled web page by comparing terms of said needy queries with at least one of: (a) an anchortext of links, obtained from the previously crawled web pages, that point to the particular uncrawled web page, and (b) a Uniform Resource Locator (URL), obtained from the previously crawled web pages, that points to the particular uncrawled web page;

means for ordering web pages to fetch by a web crawler based, at least in part, on the estimated impact, on said needy queries, of crawling the particular uncrawled page.

11. The computer system of claim 10, wherein the means for estimating the impact of fetching the particular uncrawled web page further comprises means for combining a query-based estimate and a query-independent estimate for said particular uncrawled web page by computing a weighted average of said query-based estimate and said query-independent estimate for said particular uncrawled web page;

wherein said query-based estimate for said particular uncrawled web page indicates how well said particular uncrawled web page meets neediness and relevance requirements of the needy queries and is determined based, at least in part, on the anchortext and the URL that point to the particular uncrawled web page;

wherein said query-independent estimate of said particular uncrawled web page is determined based on query-independent features of said particular uncrawled web page.

12. The computer system of claim 10, wherein the means for estimating the impact of fetching the particular uncrawled web page further comprises means for creating query sketches, for said needy queries, by computing an expected impact score for the particular uncrawled web page and expected impact scores for the previously crawled web pages that match said needy queries, and means for using the query sketches to determine the query-based estimate and the query-independent estimate for the particular uncrawled web page.

13. The computer system of claim 11, wherein the means for ordering of the web pages to fetch by the web crawler further comprises means for using the combined query-based estimate and query-independent estimate for said particular web page and computing an expected impact score using query-independent features of the particular uncrawled web page.

14. The computer system of claim 10, wherein the means for comparing terms of said needy queries with at least one of: (a) the anchortext of links, obtained from the previously crawled web pages, that points to the particular uncrawled web page, and (b) the URL, obtained from the previously crawled web pages, that points to the particular uncrawled web page further comprises means for comparing a word-level n-gram representing a query string in a particular needy query and a word-level n-gram representing an anchortext string.

15. The computer system of claim 10, wherein the means for estimating the impact, on said needy queries, of fetching the particular uncrawled web page further comprises means for computing neediness scores for said needy queries, wherein a neediness score, for a particular needy query, includes a particular needy query frequency that indicates how often the particular needy query has been issued to the search engine, and computing an improvement factor that indicates an improvement to search results generated for the particular needy query if the particular uncrawled web page would have been fetched.

16. The system of claim 2, wherein the crawl ordering engine orders the web pages to fetch by the web crawler by using the combined query-based estimate and query-independent estimate for said particular web page and computing an expected impact score using query-independent features of the particular uncrawled web page.

17. The system of claim 1, wherein the crawling policy manager compares the terms of said needy queries with at least one of: (a) the anchortext of links, obtained from the previously crawled web pages, that points to the particular uncrawled web page, and (b) the URL, obtained from the previously crawled web pages, that points to the particular uncrawled web page by comparing a word-level n-gram representing a query string in a particular needy query and a word-level n-gram representing an anchortext string.

18. The system of claim 1, wherein the crawling policy manager estimates the impact, on said needy queries, of fetching the particular uncrawled web page, by computing neediness scores for said needy queries, wherein a neediness score, for a particular needy query, includes a particular needy query frequency that indicates how often the particular needy query has been issued to the search engine, and computing an improvement factor that indicates an improvement to search results generated for the particular needy query if the particular uncrawled web page would have been fetched.

19. A non-transitory computer-readable storage medium, comprising one or more instructions, which when executed by one or more processors, cause the one or more processors to perform the steps of:
creating an index for use by a search engine, wherein the index indexes a set of previously crawled web pages;
determining which queries, from a set of queries that have been previously submitted to a search engine, qualify as needy queries;
wherein said needy queries are queries for which the index does not currently index adequate, relevant content;
estimating an impact, on said needy queries, of fetching a particular uncrawled web page by comparing terms of said needy queries with at least one of: (a) an anchortext of links, obtained from the previously crawled web pages, that point to the particular uncrawled web page, and (b) a Uniform Resource Locator (URL), obtained from the previously crawled web pages, that points to the particular uncrawled web page;
ordering web pages to fetch by a web crawler based, at least in part, on the estimated impact, on said needy queries, of crawling the particular uncrawled page.

20. The non-transitory computer-readable storage medium claim 19, wherein the instructions for estimating the impact of fetching the particular uncrawled web page further comprise instructions, which when executed, cause combining a query-based estimate and a query-independent estimate for said particular uncrawled web page by computing a weighted average of said query-based estimate and said query-independent estimate for said particular uncrawled web page;
wherein said query-based estimate for said particular uncrawled web page indicates how well said particular uncrawled web page meets neediness and relevance requirements of the needy queries and is determined based, at least in part, on the anchortext and the URL that point to the particular uncrawled web page;
wherein said query-independent estimate of said particular uncrawled web page is determined based on query-independent features of said particular uncrawled web page.

21. The non-transitory computer-readable storage medium claim 20, wherein the instructions for estimating the impact of fetching the particular uncrawled web page further comprise instructions, which when executed, cause creating query sketches, for said needy queries, by computing an expected impact score for the particular uncrawled web page and expected impact scores for the previously crawled web pages that match said needy queries, and uses the query sketches to determine the query-based estimate and the query-independent estimate for the particular uncrawled web page.

22. The non-transitory computer-readable storage medium claim 20, wherein the instructions for ordering of the web pages to fetch by the web crawler further comprise instructions, which when executed, cause using the combined query-based estimate and query-independent estimate for said particular web page and computing an expected impact score using query-independent features of the particular uncrawled web page.

23. The non-transitory computer-readable storage medium claim 19, wherein the instructions for comparing terms of said needy queries with at least one of: (a) the anchortext of links, obtained from the previously crawled web pages, that points to the particular uncrawled web page, and (b) the URL, obtained from the previously crawled web pages, that points to the particular uncrawled web page further comprise instructions, which when executed, cause comparing a word-level n-gram representing a query string in a particular needy query and a word-level n-gram representing an anchortext string.

24. The non-transitory computer-readable storage medium claim 19, wherein the instructions for estimating the impact, on said needy queries, of fetching the particular uncrawled web page further comprise instructions, which when executed, cause computing neediness scores for said needy queries, wherein a neediness score, for a particular needy query, includes a particular needy query frequency that indicates how often the particular needy query has been issued to the search engine, and computing an improvement factor that indicates an improvement to search results generated for the particular needy query if the particular uncrawled web page would have been fetched.

* * * * *